United States Defensive Publication [19] (H) [11] T103,903

Campbell et al. [43] Feb. 7, 1984

[54] FLOORING FELT COMPOSITIONS AND METHOD FOR PREPARING THE SAME

[76] Inventors: Conrad J. Campbell, Skyline Orchard, Box 164, Hockessin, Del. 19707; William D. Willis, 4636 Bailey Dr., Limestone Acres, Wilmington, Del. 19808

[21] Appl. No.: 500,718

[22] Filed: Jun. 3, 1983

Related U.S. Application Data

[63] Continuation of Ser. No. 394,048, Jun. 30, 1982, abandoned.

[51] Int. Cl.[3] ..... D21H 1/38; D21H 5/12; D21F 11/00

[52] U.S. Cl. ..... 523/206; 524/14; 524/445; 524/494; 524/502; 524/514; 524/515; 524/527; 524/543; 524/555; 162/145; 162/146; 162/156; 162/164.3; 162/164.6; 162/168.3; 162/169

[57] ABSTRACT

Flooring felt compositions having dimensional and thermal stability and resistance to water and high humidity as well as the necessary mechanical properties to provide satisfactory backing for the thermoplastic vinyl resins ordinarily used as floor coverings can be prepared by forming an anionic aqueous fiber dispersion of from about 4 to about 55% and preferably from about 8 to about 35% of water dispersible spurted polyolefin fibers, from about 2 to about 30% of wood pulp fibers, from about 2 to about 20% water dispersible glass fibers, from about 1 to about 10% of an anionic polyacrylamide resin, from about 0 to about 50% of an inorganic filler, from about 5 to about 25% of an anionic, elastomeric polymeric binder and from about 1 to about 10% of a cationic resin (all percentages of the above components are by weight, based on the dry weight of flooring felt composition) and then passing the resulting dispersion through a paper making machine to form a fibrous sheet material.

10 Claims, No Sheets Drawing,

25 Pages Specification

The file of this unexamined application may be inspected and copies thereof may be purchased (849 O.G. 1221, Apr. 9, 1968).